Jan. 5, 1954

E. F. HUBACKER ET AL 2,665,414

ELECTRICAL HINGE

Filed Nov. 12, 1949

Inventors:
Earl F. Hubacker and
Fred L. Tarleton
By: Edward C. Fritzlaugh
Atty.

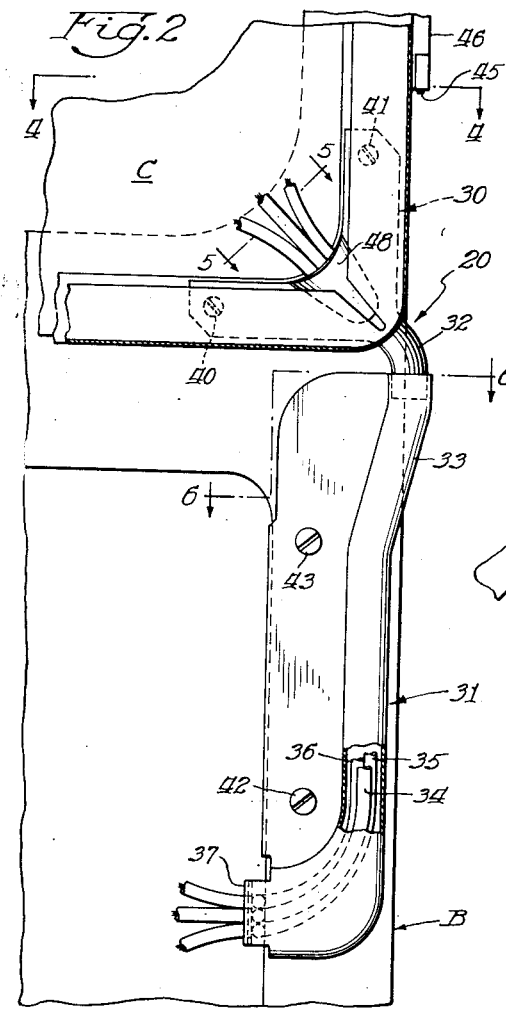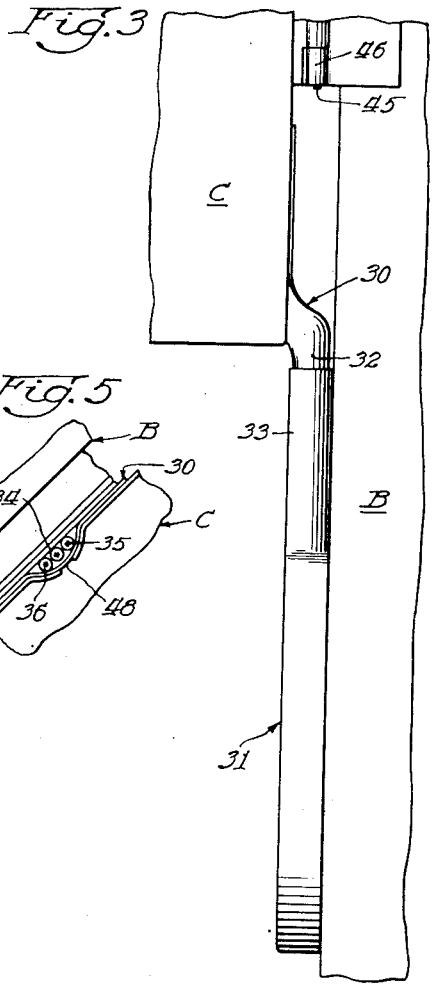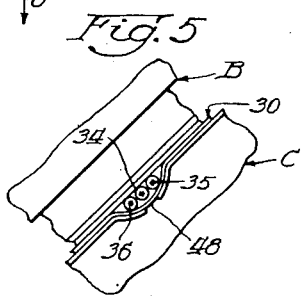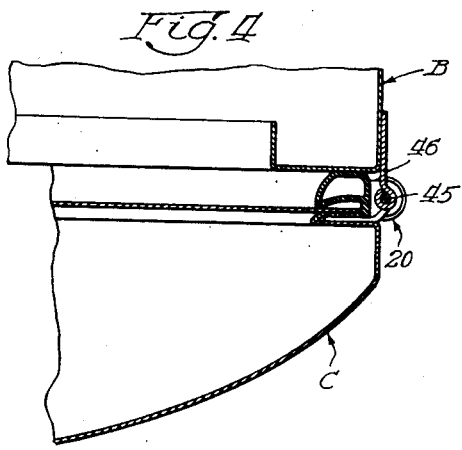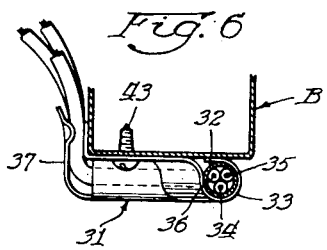

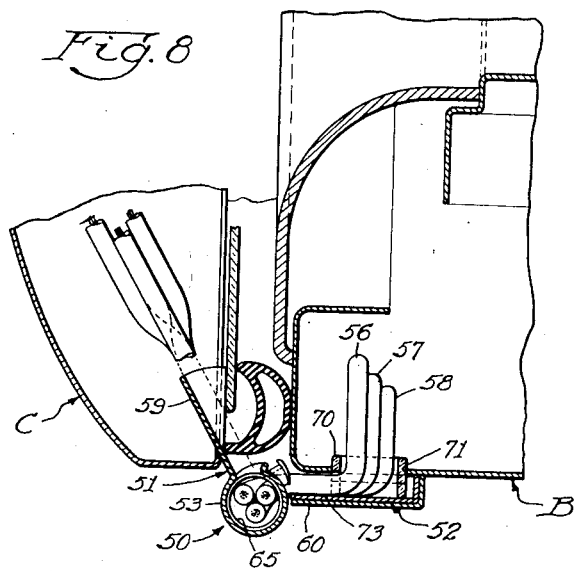
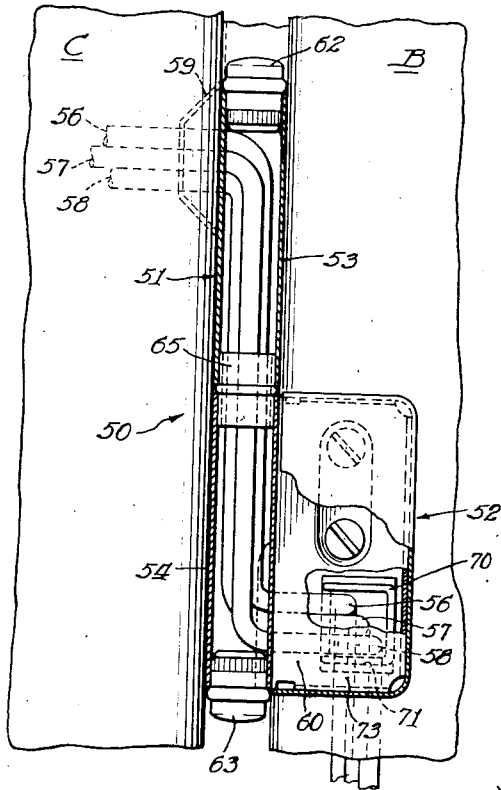
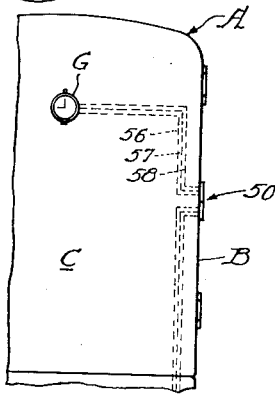
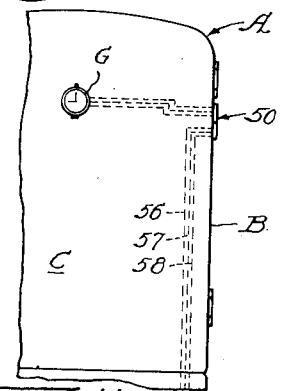
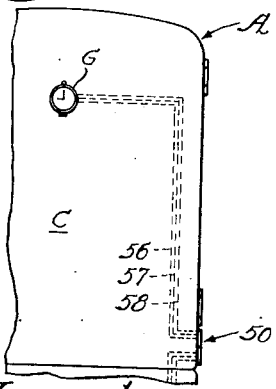
Inventors:
Earl F. Hubacker and
Fred L. Tarleton Patented Jan. 5, 1954

2,665,414

UNITED STATES PATENT OFFICE 2,665,414

ELECTRICAL HINGE

Earl F. Hubacker and Fred L. Tarleton, Muskegon, Mich., assignors to Borg-Warner Corporation, Chicago, Ill., a corporation of Illinois Application November 12, 1949, Serial No. 126,818

1 Claim. (Cl. 339—4)

This invention relates in general to electrical hinges particularly adaptable for advantageous employment as a means for transmitting electrical energy between two movable objects, such as, for example, between the cabinet and compartment door of a conventional refrigerator so as to supply electrical energy from the cabinet to an electrical device disposed on or in the compartment door.

Heretofore, the disposition of electrical devices on the compartment door of the refrigerator proved to be impractical because no means were available to economically provide for transmission of current from the cabinet to the door. Moreover, in the home appliance field particular problems presented themselves such as, for example, overcoming the proposition of short circuiting or deterioration of the wires which could be caused by bending or because of grease or normal vapors found in the kitchen. In this connection the Underwriters' Laboratories frowned upon all such prior devices because they were not considered safe and that children could cut the wires and fire hazards were present in such prior constructions.

It is recognized that in the prior art numerous attempts have been made to provide an electrical hinge of this general class and efforts have been made to overcome the various deficiencies found in such prior art structures, but to the best of the applicant's knowledge the prior art structures have had only limited success, and have been accorded only limited commercial recognition. It is believed that this fact results from apparent deficiencies of the prior art structures, their nonadaptability for universal application and their expensive construction which so greatly increased the cost as to seriously handicap sales acceptance.

The present improvements in electrical hinges are directed to simplify their construction and their mode of operation, and also to provide an electrical hinge which may readily and conveniently be employed universally to various appliances presently being commercially exploited, and particularly so, where it is desired to transmit electrical current between two elements, one of which is movable with respect to the other. Moreover, the present device seeks to employ conventional parts wherever necessary and possible, thereby to effect a substantial reduction in cost over the prevailing types of electrical hinges presently being employed.

Accordingly, an object and accomplishment of the invention is to provide an electrical hinge arranged for advantageous transmission of electrical energy between two elements one of which is movable with respect to the other, said electrical hinge being particularly and advantageously applicable for employment in a home appliance such as a refrigerator where it is desired to transmit electrical energy from the cabinet to an electrical device disposed in or on the compartment door, said electrical hinge being particularly characterized in its simple but sturdy construction and in its convenient, fool-proof and safe operation.

Another object and accomplishment of the invention is to provide an electrical hinge arranged for advantageous transmission of electrical energy from the cabinet of a refrigerator to the compartment door to effect operation of various devices disposed in or on the compartment door such as, for example, an electric clock which may or may not be suitably wired and connected for employment as a defrosting regulator, or, a butter softener employing electrical energy to control the viscosity of the butter.

A further object and accomplishment of the invention is to provide an improved electrical hinge by co-relating and especially designing the various elements thereof, whereby there shall be such cooperation between said improved elements as will best serve the purpose of providing an efficient electrical hinge capable of being manufactured at low cost and yet giving maximum of satisfactory service in use.

Another object and accomplishment of the invention is to provide an electrical hinge particularly adaptable for application to refrigerators where it is desired to transmit electrical energy from the cabinet to an electrical device disposed on or in the compartment door, said electrical hinge having means providing complete enclosure of the electrical conductors and is fireproof and safe in its operation for the purposes intended, the device in question being approved by the Underwriters' Laboratories for the uses and purposes herein set forth.

The invention seeks, as a further object and accomplishment, to provide an electrical hinge as contemplated herein and characterized by an arrangement of parts to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claim.

With the above and other incidental objects in view, the invention has other marked improvements and superiorities which radically distinguishes it from presently known structures, these improvements in the invention residing in the novel construction and cooperative function of the parts thereof, the combination of the parts and the arrangement thereof as illustrated in the drawing and which will be more fully described hereinafter and particularly pointed out in the claim.

In the accompanying drawing on which there is shown a preferred embodiment of the invention, Fig. 1 is a front elevational view of a refrigerator illustrating the relative disposition of the electrical hinge embodying the features of the present invention;

Fig. 2 is an elevational view of a portion of the refrigerator illustrated in Fig. 1, with the front face panel of the compartment door removed to show the attachment of a part of the electrical hinge to the inner panelled surface of the door and with the vegetable bin removed to show the manner of attachment of another part of the electrical hinge contemplated by this invention.

Fig. 3 is a side elevational view of the electrical hinge construction depicted in Fig. 2;

Fig. 4 is a top plan view of portions of the refrigerator depicted in Fig. 1 and being taken substantially on the plane of the line 4—4 in Fig. 2 and having portions thereof shown in section to more clearly illustrate the construction thereof;

Fig. 5 is an elevational view of a portion of the electrical hinge depicted in Fig. 2 and being taken substantially on the plane of the line 5—5 in Fig. 2;

Fig. 6 is a top plan view of a portion of the electrical hinge depicted in Fig. 2 and being taken substantially on the plane of the line 6—6 in Fig. 2 and illustrating the electrical hinge as being secured to a panelled surface of the refrigerator cabinet, said panelled surface being disposed behind the hinged vegetable bin normally disposed adjacent the lower portions of a refrigerator;

Fig. 7 is a side elevational view of a modified form of electrical hinge embodying the features of the present invention with portions thereof shown in section to clearly illustrate the construction thereof;

Fig. 8 is a plan view of the electrical hinge depicted in Fig. 7 and having portions thereof shown in section to more clearly illustrate the construction thereof;

Fig. 9 is a front elevational view of a portion of a refrigerator illustrating one position of the electrical hinge depicted in Figs. 7 and 8;

Fig. 10 is a front elevational view of a refrigerator depicting another arrangement of the electrical hinge depicted in Figs. 7 and 8; and Fig. 11 is a front elevational view of portions of a refrigerator illustrating another position of the electrical hinge depicted in Figs. 7 and 8.

The drawings are to be understood to be more or less of a schematic character for the purpose of illustrating and disclosing typical or preferred forms of the improvements contemplated herein and in the drawings like reference characters identify the same parts in the several views.

Figure 1:
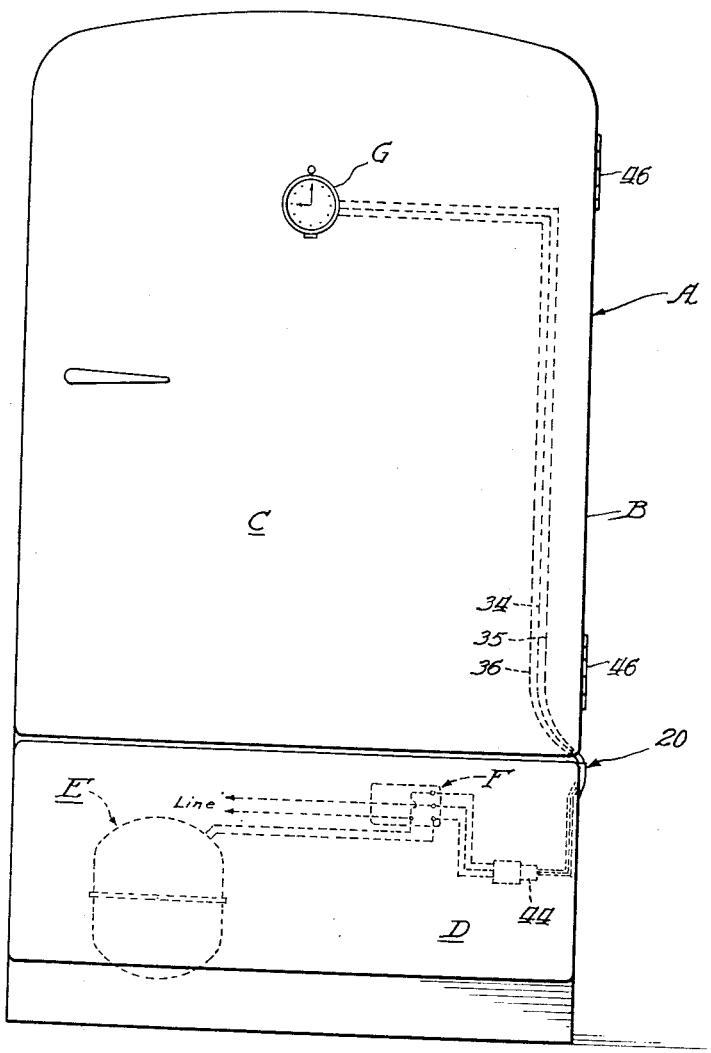

As one possible example of advantageous employment of one form of the contemplated electrical hinge, reference is made to the drawings, particularly Fig. 1, wherein there is illustrated one form of electrical hinge with which the present invention is particularly concerned and designated in its entirety by the numeral 20 and being operatively associated, for example, with a conventional refrigerator designated in its entirety by the letter A.

Another but modified form of electrical hinge contemplated by this invention is designated in its entirety by the numeral 50 and in Figs. 9, 10 and 11 the electrical hinge 50 is respectively shown in three different possible positions, the refrigerator in each case being of identical construction as the conventional refrigerator designated by the letter A and illustrated in Fig. 1. Accordingly, it is deemed sufficient to only describe one such refrigerator as at A.

The illustrated refrigerator A may comprise a cabinet B having a compartment door C and a vegetable bin D disposed at the lower portions of the cabinet B. Operatively disposed behind the vegetable bin D in a suitable mechanism compartment there is provided a suitable refrigerator compressor assembly E having conventional wiring panels and arrangements F to effectively cause operation of same.

Disposed in the central upper regions of the door there is provided an electrical device such as, for example, the electrical clock G as illustrated which requires electric energy to effect operation of same. In this connection, it may be stated that the electrical clock may or may not be employed as a medium to control defrosting of the refrigerator. Moreover, it is to be understood that although a clock has been disclosed as a matter of illustration of one electrical device, it is conceivable that other electrical devices may be disposed on or in the door and require electrical energy for their operation and to which the contemplated electrical hinges 20 or 50 may be adjunctively employed to advantageously supply such devices with electrical energy from the cabinet proper.

Suffice it to say, since the invention is not particularly concerned with the precise construction of the illustrated refrigerator and/or its associated parts they will not be further described in detail, and it is deemed sufficient for all intentions and purposes herein contained to show only portions adjacent to and cooperating with the electrical hinges contemplated herein. It is to be understood that details of construction of such refrigerators or other appliances with which the electrical hinges contemplated herein may advantageously be employed, and/or their associated parts, may be modified to suit particular conditions or to satisfy the engineering genius of various manufacturers and in some instances the contemplated electrical hinges may be advantageously employed in other types of appliances, and I do not wish to be limited to the construction of these elements as set forth except where such construction particularly concerns the invention contemplated herein.

Having thus described, by way of example, possible adaptations of the electrical hinges gener- ally indicated at 20 and 50 and as contemplated herein, and having respectively described the general environment surrounding the adaptations, the specific construction and cooperative functions of the parts of the electrical hinges 20 and 50 with which the present invention are particularly concerned, will now be described in detail.

In the exemplary embodiment of the invention depicted in Figs. 1, 2 and 3, one form of electrical hinge generally indicated at 20 and with which the present invention is particularly concerned comprises, in general, a first bracket 30 and disposed at and carried by the inside lower corner portions of the compartment door C and is arranged to move and swing with said compartment door, a second bracket 31 carried by and held in a fixed position with respect to portions of the cabinet B disposed below and adjacent to the first bracket 30, said first bracket 30 having tubular formations 32 adapted to be received into a corresponding tubular formation 33 which forms a part of the second bracket 31, said tubular formations 32 and 33 being arranged to advantageously receive a plurality of electrical conductors 34, 35 and 36, said second bracket 31 having means as at 37 to securely hold said electrical conductors in their operative position, and said tubular formations 32 and 33 being respectively arranged so that the twist of the electrical conductors, when the compartment door C is opened and closed, is distributed over a long area which effectively prevents destruction of the electrical conductors due to bending or twisting at a concentrated point.

Referring more particularly to Fig. 2, the first bracket 30 is shown removably but fixedly secured to the inside lower corner portions of the compartment door by means of the screws 40 and 41 while the second bracket 31 is fixedly and removably secured to the cabinet B by means of the screws 42 and 43. Adverting to Fig. 1, it can be seen that the end portions of the electrical conductors 34, 35 and 36 are provided with a male member 44 of an electrical socket. Thus, it can be seen that by first removing the male member 44 from its position in the socket and by removing the screws 40, 41, 42 and 43 and thereafter removing the pins 45 from the hinges 46, the entire cabinet door can be removed for repair purposes. This is an important feature of the invention since not only for repair purposes but also for assembly purposes, the door unit including the electrical hinge and its component parts become an integral unit, thereby to permit ease in assembly and provides for convenience in the removal of the compartment door C for repair or replacement purposes. It is important to understand that, as shown in Fig. 1, the electrical conductors 34, 35 and 36 running up to the clock G are normally embedded in the insulation contained between the door panels. If it were necessary to separate the door panels to remove the electrical conductors in order to remove the door, the cost would be prohibitive.

Adverting to Figs. 2 and 6, it can be seen that the electrical conductors 34, 35 and 36 are clamped and held in position by the resilient spring clamp means 37. By the same token, the upper portions of the electrical conductors 34, 35 and 36 are clamped and held in position by portions 48 of the first bracket 30. Thus, it can be seen that the twist in the electrical conductors 34, 35 and 36 is distributed over a large area, that is to say, over the area between the clamping portion 48 of the first bracket 30 and the spring clamping means 37 which forms a part of the second bracket 31. It is important to understand that the electrical conductors 34, 35 and 36 are disposed relatively loose in the tubular portions 32 and 33. The relatively large area for twist prevents fatigue of the electrical conductors at any one concentrated point, thereby to overcome the deficiencies found in prior art structures and prevent destruction of the electrical conductors due to the twisting thereof when the cabinet door is opened and closed.

Having thus described one form of electrical hinge contemplated by this invention as at 20 and illustrated in Figs. 1 through 6, another but modified form of electrical hinge generally indicated at 50 and illustrated in Figs. 8 through 11 will now be described in detail.

In the exemplary embodiment of the invention depicted in Figs. 7, 8, 9, 10 and 11, the modified electrical hinge 50 with which the present invention is particularly concerned comprises, in general, a first bracket 51 carried by portions of the compartment door C and arranged to move and swing with said compartment door, a second bracket 52 carried by and held in a fixed position with respect to portions of the cabinet B and disposed below and adjacent to the first bracket 51, said first bracket 51 having a tubular formation 53 disposed in alignment with a corresponding tubular formation 54 forming a part of the second bracket 52, said tubular formations 53 and 54 being arranged to advantageously receive a plurality of electrical conductors 56, 57 and 58, said first bracket 51 and said second bracket 52 each having means respectively as at 59 and 60 to securely hold said electrical conductors in their operative position, and said tubular formations 53 and 54 being respectively arranged so that the twist of the electrical conductors, when the compartment door C is opened and closed, is distributed over a long area which effectively prevents destruction of the electrical conductors due to bending or twisting at a concentrated point.

Disposed at the top and bottom of the electrical hinge 50 and in order to provide a suitable trim for same, there is provided hinge studs 62 and 63 having portions arranged to be respectively received into the tubular formations 53 and 54 as illustrated. Disposed between the tubular formations 53 and 54 is a bushing 65 having portions arranged to be respectively received into the lower portions of the tubular formation 53 and the upper portions of the tubular formation 54, thereby to assist in keeping the tubular formations 53 and 54 in proper alignment.

A suitable grommet 70 operatively associated with the second bracket 52 is disposed in a manner so as to be received into an aperture 71 disposed in the cabinet B of the refrigerator in order to provide a means for eliminating sharp edges and corners which could injure the covers of the electrical conductors.

Adverting to Figs. 7 and 8, it can be seen that the electrical conductors 56, 57 and 58 are clamped and held in position by virtue of being disposed as at 69 (Fig. 7) between the outer wall of the compartment B and the outer wall 73 of the second bracket 52 as illustrated in Fig. 8. By the same token, the upper portions of the electrical conductors 56, 57 and 58 are clamped and held in position by resilient spring clamp means generally indicated at 59 and forming a part of the first bracket 51. Thus, it can be seen that the twist in the electrical conductors 56, 57 and 58 is distributed over a large area, that is to say, over the area between the clamping portion 59 of the first bracket 51 and the clamping means as at 60 which forms a part of the second bracket 52. It is important to understand that the electrical conductors 56, 57 and 58 are disposed relatively loose in the tubular formations 53 and 54. The relatively large area for twist prevents fatigue of the electrical conductors at any one concentrated point, thereby to overcome the deficiencies found in prior art structures and prevent premature distribution of the electrical conductors due to the twisting thereof when the cabinet door is opened and closed.

Particular attention is directed to Figs. 9, 10 and 11, each of which discloses identical electric hinge constructions as at 50 but illustrate the various positions which may be taken by the electrical hinge to effectively and advantageously perform the functions intended by this invention.

For example, in Fig. 9, the electrical hinge is shown disposed approximately midway between the cabinet door hinges, while in Fig. 10 the electrical hinge 50 is illustrated as being disposed just below the upper cabinet door hinge and in Fig. 11 the electrical hinge 50 is shown disposed just below the lower cabinet door hinge. It is notable that the electrical hinge 50 will operate equally as well in any one of the illustrated positions.

With respect to the electrical hinge 20 and the electrical hinge 50, particular attention should be directed to the fact that in each of these constructions as hereinbefore disclosed, the electrical conductors are completely enclosed and are not subject to contact with grease and destructive vapors usually found in the kitchen. Moreover, because of the complete enclosure of the electrical conductors, danger to children is eliminated in that they could not cut the wires and no loose wires are exposed to cause fire hazards.

The important feature of ease in assembly and convenience in disassembly is particularly advantageous in mass production manufacturing.

Although it has been found advantageous to form the brackets of the electrical hinges 20 and 50 of a suitable metal, it is obvious that other materials could be advantageously employed such as, for example, plastic or other like composition. When a metal is employed, it may be chromium plated or any other like finish, or the entire assembly may be painted white to match the color of the refrigerator cabinet.

From the foregoing disclosure, it may be seen that we have provided an improved electrical hinge construction particularly adaptable for home appliances and which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of an electrical hinge arranged for advantageous transmission of electrical energy from the cabinet of a refrigerator to the compartment door to effect operation of various electrical devices disposed in or on the compartment door.

While we have illustrated preferred embodiments of our invention, many modifications may be made without departing from the spirit of our invention, and we do not wish to be limited to the precise details of construction set forth but wish to avail ourselves of all changes within the scope of the appended claim.

We claim:

For a cabinet having a door hinged thereto, said cabinet and said door having at least one supporting hinge operatively associated therewith, means including continuous electrical conductors for distributing electrical current from said cabinet to said door, said means comprising a first bracket carried by said door and having portions thereof formed to define a tubular formation integral with said first bracket and adapted to contain said electrical conductors and disposed so that the axis thereof coincides with the axis of the support hinge of said door, a second bracket carried by said cabinet and disposed below and adjacent to said first bracket and having portions thereof formed to define a tubular formation integral with said second bracket and adapted to contain said electrical conductors and disposed so that the axis of the upper portions thereof of the tubular formation coincides both with the axis of the support hinge of the door and the axis of the tubular formation of said first bracket, means joining the lower end portion of said tubular formation of said first bracket and the upper end portion of said tubular formation of said second bracket, said tubular formations and said last-mentioned means being constructed and arranged to provide a complete enclosure for said continuous electrical conductors, clamp means disposed at the lower end portions of said second bracket and formed integral therewith to securely hold said electrical conductors, clamp means disposed at the upper end portions of said first bracket and formed integral therewith to securely hold said electrical conductors, and each of said clamp means being arranged so that the twist of the electrical conductors will be distributed over a relatively long area when the said door is opened and closed, thereby to prevent destruction of the electrical conductors due to bending and twisting at a concentrated point, said brackets and tubular formations being independent of the supporting hinge for said cabinet and door to allow assembly and disassembly independently thereof.

EARL F. HUBACKER.
FRED L. TARLETON.

References Cited in the file of this patent

UNITED STATES PATENTS

| Number | Name | Date |
|--------|------|------|
| 291,171 | Edmunds | Jan. 1, 1884 |
| 531,515 | Davis | Dec. 25, 1894 |
| 612,192 | Chandler | Oct. 11, 1898 |
| 1,661,294 | Lemaster | Mar. 6, 1928 |
| 2,113,560 | Davis | Apr. 12, 1938 |
| 2,522,989 | Carbary | Sept. 19, 1950 |

FOREIGN PATENTS

| Number | Country | Date |
|--------|---------|------|
| 275,265 | Great Britain | Mar. 1, 1928 |